United States Patent [19]
Oh et al.

[11] 3,981,558
[45] Sept. 21, 1976

[54] LIQUID CRYSTAL ELECTRO-OPTICAL DISPLAY

[75] Inventors: Chan Soo Oh, Diamond Bar; Paul Y. Hsieh, Irvine, both of Calif.

[73] Assignee: Timex Corporation, Waterbury, Conn.

[22] Filed: Nov. 12, 1973

[21] Appl. No.: 415,200

[52] U.S. Cl.............................. 350/160 LC; 252/299; 252/408
[51] Int. Cl.².................... C09K 3/34; G02F 1/13
[58] Field of Search...................... 252/299, 408 LC; 350/160 LC

[56] References Cited
UNITED STATES PATENTS

| | | | |
|---|---|---|---|
| 3,322,485 | 5/1967 | Williams | 252/299 |
| 3,499,702 | 12/1967 | Goldmacher et al. | 252/299 |
| 3,691,755 | 9/1972 | Girard | 252/299 |
| 3,712,047 | 1/1973 | Girard | 350/160 LC |
| 3,750,383 | 8/1973 | Kakizawa | 58/50 R |
| 3,767,289 | 10/1973 | Aviram et al. | 252/408 LC |
| 3,815,972 | 6/1974 | Hsieh | 252/408 LC |

*Primary Examiner*—Benjamin R. Padgett
*Assistant Examiner*—T. S. Gron
*Attorney, Agent, or Firm*—William C. Crutcher

[57] ABSTRACT

An electro-optical display, utilizing the field effect display, includes a thin layer of liquid crystal material positioned between two plates having electrically conductive segments. The material is a mixture of a selected stilbene, such as trans-4-n-butyl-alpha-chloro-4'-ethoxystilbene and a selected substituted benzylideneaminobenzonitrile, such as p-ethoxy-benzylidene-p'-aminobenzonitrile.

5 Claims, 2 Drawing Figures

LIQUID CRYSTAL ELECTRO-OPTICAL DISPLAY

BACKGROUND OF THE INVENTION

The present invention relates to a liquid crystal display and more particularly to a liquid crystal display which is operable under relatively low voltage and at room temperatures.

At the present time liquid crystal displays are receiving considerable research and commercial attention since they present, in some circumstances, advantages compared to other types of electro-optical displays. For example, compared to cathode ray tubes, the electro-optical displays utilizing liquid crystal materials do not emit heat, may be of lower cost, and have a relatively long life. Further advantages are no wash-out under bright illumination and low power consumption.

It has been suggested that liquid crystal displays may be used in a wide variety of applications, some of these applications being specified in U.S. Pat. No. 3,322,485 to Williams, issued May 30, 1967. For example, such electro-optical displays may be used in portable electronic calculators and as the time indications for horological movements. For example, it has been suggested that an accurate electronic watch may be produced using a quartz crystal oscillator as its time frequency, a series of countdown circuits, and an electro-optical display consistng of a dial having a liquid crystal material. The dial may either present digital numerals, for example, made up of segments which are either activated or not activated, or alternatively may consist of segments which approximate, and appear to be similar to, the continuous circular movement of hands.

One difficulty which has been experienced with the previously suggested liquid crystal displays has been that their power consumption was relatively high. Those displays having a high power consumption are unsuitable for use in portable instruments using a self-contained battery. Another difficulty with certain of the previously suggested displays has been that they do not operate at all the temperatures which the devices may encounter, for example, at room temperatures or outside in a cold climate at below the freezing point. Still another difficulty has been with the clarity of the displays, that is, that the contrast compared to the background has not been sufficient under all ambient lighting conditions for readily ascertaining which segments have been activated. Still another—and in many respects the major—difficulty has been the relatively high voltge which has been required to operate the liquid crystal displays. In many cases the voltages required exceeded 12 volts (rms) and in still other cases they are greater than 5 volts (rms). Such a requirement necessitates the provision within the instrument of a plurality of batteries or special electronic circuits in order to raise the voltage to the required level.

Certain of th previously suggested liquid crystal displays used dynamic scattering effect and others the field effect (twister effect). Those using dynamic scattering consume power but very little power is comsumed in the displays, such as the displays of the present invention, which use the field effect.

In dynamic scattering mode a thin film of a nematic liquid crystal is positioned between two plates having aligned conductive segments. The liquid crystal molecules are aligned uniformly by use of alignment dopants so that its "off" state is optically clear. The segments are connected to a power source so that an electric field is applied across that portion of the liquid crystal which is between the segments. Above a certain threshold potential, ions which are present as impurities or can be added intentionally in the liquid crystal, undergo violent vertical movement exerting effective shearing force to the ordered array of the nematic liquid. The resultant abrupt local changes in the refractive indices of the liquid crystal causes the intense light scattering.

The field effect uses the same type of structure, that is, a thin layer of liquid crystalline material between two conductors. The liquid crystalline material used in field effect displays is different from those used in dynamic scattering displays. The field effect materials consist of rod shaped molecules wherein the dielectric constant parallel to the major molecular axis is considerably larger than that of the perpendicular; that is called positive dielectric anisotropy. In the field effect displays, surfaces of the two conductive plates are modified unidirectionally by appropriate physical and/or chemical means. Then the two plates are face to face in such a manner that the unidirectional characteristics of the two plates assume 90°. Field effect materials enclosed in such an environment will become a unique optical medium, which can rotate the incident plane polarized light by 90°.

SUMMARY OF THE INVENTION

In accordance with the present invention an electro-optical display is prepared using a thin layer of liquid crystal material positioned between two plates. The liquid crystal material is a mixture of certain selected substituted stilbenes which are negative dielectric anisotropic materials and certain selected benzylideneaminobenzonitriles which are positive dielectric anisotropic materials. And the resultant mixtures also exhibit positive dielectric anisotropy.

The mixture forms an electro-optical device which operates by field effect.

The selected stilbenes of the mixture include: (Compound I) Trans-4-n-butyl-alpha-chloro-4'-ethoxystilbene
and
(Compound V) Trans-4-n-octyl-alpha-chloro-4'-ethoxystilbene The selected stilbenes, set forth above, are mixed with one or more compounds which are selected from p-ethoxy benzylidene-p'-aminobenzonitrile and a selected few of its alkoxy homologs.

DETAILED DESCRIPTION

Figure 1:
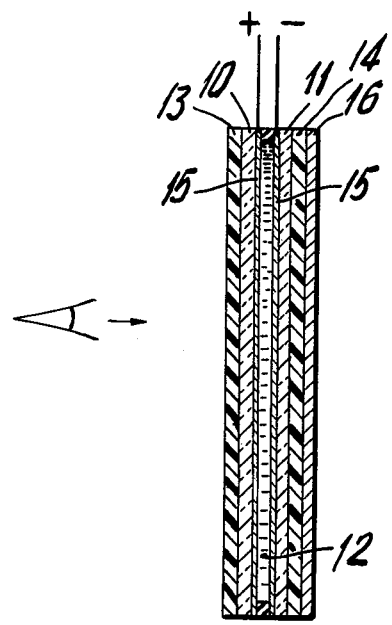
FIG. 1 is a side cross-sectional view of the electro-optical display cell of the present invention.

As shown in the accompanying FIG. 1, an electro-optical display includes two thin plates 10 and 11, for example of glass, having a thin layer of liquid crystal material 12 between them. In the examples of the present invention, the layer of liquid materials 12 is one-half of a mil thick. The first plate 10 is of glass or other clear material and may be the dial of a watch. It has on its internal surface, that is, the surface next to the liquid crystal material, a thin transparent conductive layer 15, for example, of tin oxide or indium oxide, which is electrically conductive and in the desired pattern. For example, the desired pattern may be segments of a digital display or may be lines or segments representing an analog display similar to the progression of hands moving about the dial of the watch. The second plate 11 is also conductive on its surface next to the liquid crystal material. However, that surface must be transparent. The two plates, together with their enclosed liquid crystal material, are sealed so as to form a display cell.

In one method of operation, when the direct current, pulsed DC or AC field is applied, for example, of 3 volts (rms), the liquid crystal molecules in the portion crossed by the field align parallel to the applied field (perpendicular to the electrode surfaces). This contrast may be enhanced by the use of polarizing plates. As shown, a front linear polarizing outer sheet 13 may be placed parallel to or on top of the transparent plate 10 and a second polarizing plate 14 may be placed behind the second plate 11 in those instances when the cell is used as a light valve. The liquid crystal material 12, when it has an electrical field applied across it, will cause rotation of the plane of polarization of polarized light. Without the two linear polarizer sheets, the liquid crystal material will appear to be clear transparent whether there is an electric field applied or not. However, when the field is applied across selected segments of the display cell with polarizer sheets 13 and 14, then those segments will appear darker or lighter depending upon whether the polarizing direction of the two polarizers are placed cross or parallel. For reflective mode displays, which are preferred for the watch application, a diffuse reflector 16 is placed behind the polarizer sheet 14. The reflector may be prepared by sand blasting the opposite (or uncoated) side of a thin glass mirror. A sheet of aluminum foil may also be used as a reflector.

Polarized light, which is produced by sheet 13, is light which has its electric vector oriented in a defined fashion. Ordinary light is polarized light in which the electric vector is randomly oriented.

The present invention utilizes two linear sheet polarizers for outer sheets 13 and 14. Generally there are three types of sheet polarizers presently available. The first type is a plastic resin sheet in which a microcrystalline polarizer consisting of crystals of dichroic material is embedded parallel to each other in the sheet. For example, such a sheet may be manufactured by imbedding quinine iodosulfate in viscous polyvinyl chloride and extruding the material through a slit. A second type of sheet polarizer is obtained by placing an iodine solution on a transparent oriented sheet of plastic resin such as polyvinyl alcohol. The iodine molecules become parallel to the oriented molecules of the resin sheet and the resulting dyed sheet is strongly dichroic. The third type of plastic sheet material is a synthetic resin film in which the resin molecules are oriented, for example, polyvinylene. Each of these types of sheet polarized material is quite inexpensive and the processes they undergo to become polarized are low in cost. The linear polarized sheets will have a transmittance of from 40–50% of light parallel to the axis and practically no transmittance for light perpendicular to the axis.

Figure 2:
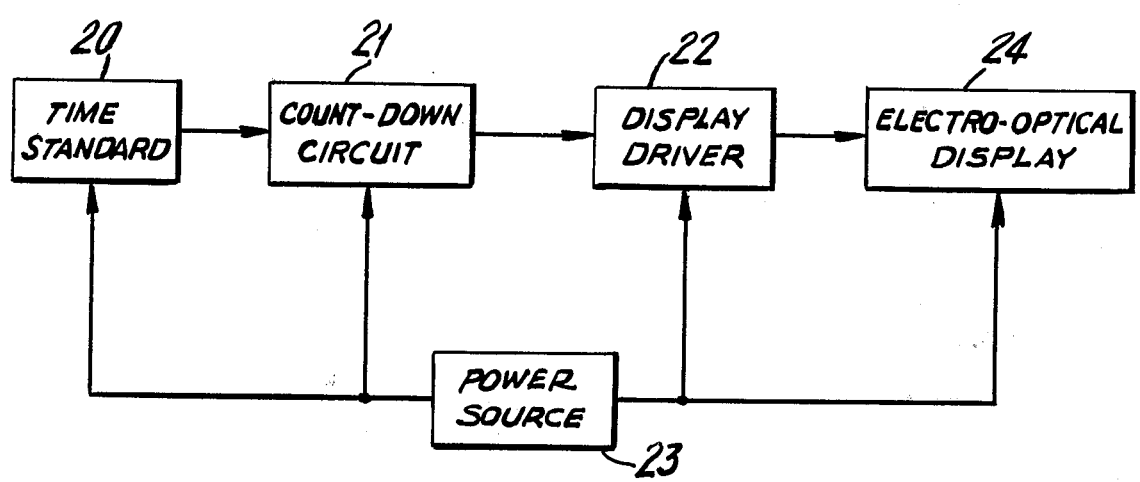
FIG. 2 is a block schematic drawing of a horological movement utilizing the electro-optical display of the present invention.

As shown in FIG. 2, a horological instrument, such as a watch, utilizes the electro-optical display of the present invention. The horological instrument includes a time standard, such as a high frequency quartz crystal oscillator 20, a countdown circuit 21, such as a series of flip-flop circuits, a display driver circuit 22, a power source 23, such as a d.c. battery cell, and the electro-optical display 24, of the type shown in FIG. 1. The display 24 is the liquid crystal cell and uses segments which are selectively activated to form an analog type or a digital type of display of the time.

The stilbene derivates selected for use in the liquid crystal mixture of the present invention are nematic liquids which are substituted trans-stilbene derivatives. They have the general formula

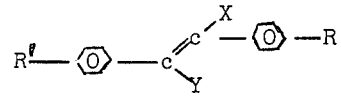

In that general formula R is an alkyl radical which is n-butyl (n — $C_4H_9$) or n-hexyl (n — $6_6H_{13}$) or n-heptyl (n—$C_7H_{15}$) or n-octyl (n — $C_8H_{17}$). R' is an alkoxyl group which is ethoxy (Nos. I, II, III, IV and V) or butyloxy (No. VI) or hexyloxy (No. VII). X and Y are hydrogen or chlorine, and when X is hydrogen, Y is chlorine; and when Y is hydrogen, X is chlorine.

The seven selected stilbenes are set forth below:

| | R' | R | X | Y |
|---|---|---|---|---|
| I | $C_2H_5O$ | n-$C_4H_9$ | Cl | H |
| | Trans-4-n-butyl-alpha-chloro-4'-ethoxystilbene<br>This is the preferred stilbene. | | | |
| II | $C_2H_5O$ | n-$C_4H_9$ | H | Cl |
| | Trans-4-n-butyl-beta-chloro-4'-ethoxystilbene | | | |
| III | $C_2H_5O$ | n-$C_6H_{13}$ | Cl | H |
| | Trans-4-n-hexyl-alpha-chloro-4'-ethoxystilbene | | | |
| IV | $C_2H_5O$ | n-$C_7H_{15}$ | Cl | H |
| | Trans-4-n-heptyl-alpha-chloro-4'-ethoxystilbene | | | |
| V | $C_2H_5O$ | n-$C_8H_{17}$ | Cl | H |
| | Trans-4-octyl-alpha-chloro-4'-ethoxystilbene<br>This is also the preferred stilbene. | | | |
| VI | n-$C_4H_9O$ | n-$C_4H_9$ | Cl | H |
| | Trans-4-n-butyl-alpha-chloro-4'-butyloxystilbene | | | |
| VII | n-$C_6H_{13}O$ | n-$C_4H_9$ | Cl | H |
| | Trans-4-n-butyl-alpha-chloro-4'-hexyloxystilbene | | | |

Nos. I and II may be derived from Trans-4-n-butyl-4'-ethoxy-stilbene. Nos. III, IV and V are derived from Trans-4-n-alkyl-4'-ethoxy-alpha-chloro-transstilbenes. Nos. VI and VII are homologs of No. I, in which R (Alkoxyl group) is butyloxy and hexyoxy.

More than one of the above-listed seven transstilbenes may be used in the mixture. For example, a compound may consist of two of the above-listed stilbenes together with at least one of the other materials set forth below.

The other materials in the liquid crystal mixtures are selected homologs, and mixtures of those selected homologs, having the general formula:

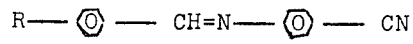

wherein R may be aliphatic alkoxy ($CH_3—(CH_2)_n—O—$) or aliphatic alkanoate ($CH_3—(CH_2)_n—COO—$), and n is an integer. These selected compounds from the above formula are as follows:

VIII p-Ethoxybenzylidene-p'-aminobenzonitrile
IX p-n-Butoxybenzylidene-p'-aminobenzonitrile
X p-n-Hexyloxybenxylidene-p'-aminobenzonitrile
XI p-n-Octanoyloxybenxylidene-p'-aminobenzonitrile The stilbene derivatives I through VII may be prepared by knwon methods. For example, compounds I, III, IV and V are obtained by treating the respective p-ethoxybenzyl-p'-alkylphenyl ketones with phosphorus pentachloride, while the ketones are prepared by the conventional Friedel-Craft's condensation of p-ethoxyphenylacetyl chloride and n-alkylbenzenes. Similarly, compounds VI and VII are prepared from p-alkoxybenzyl-p'-n-butylphenyl ketones. Compound II may be obtained from the intermediate, p-n-butylbenzyl-p-ethoxyphenyl ketone in the anologous manner. The preferred material compounds I and V are commercially available from Aldrich Chemical Co. or from Eastman Organic Chemicals. The aminobenzonitriles of compounds VIII through XI may be prepared as described in U.S. Pat. No. 3,499,702 issued Mar. 10, 1970 to Goldmacher et al.

Some of the specific liquid crystal materials within the present invention are set forth in the following Examples 1 through 5.

EXAMPLE 1

A mixture of p-ethoxy-benzylidene-p'-aminobenzonitrile

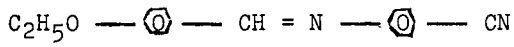

(Compound VIII) and p-n-butoxy benzylidene p'-amino-benzonitrile

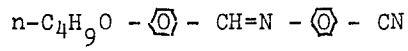

(Compound IX) at a weight ratio of 1 to 1 (C–N=75; N–L=116) was prepared. One part (by weight) of that mixture ws mixed with 4 parts (by weight) of the trans-stilbene which was Trans-4-n-butyl-alpha-chloro-4'-ethoxystilbene. (Compound I) the final mixture had C–N=–20° and N–L=54°C. The material was placed in a display cell having ½ mil of thickness of the liquid crystal material, and could be operated by 5V/D.C. or A.C.V(rms). The cell showed a switch-on (or rise) time of 80 m sec. and a switch-off (decay) time of about 100 m sec. The contrast of the display was better than 30 to 1, at 3 V D.C.

EXAMPLE 2

One part of p-n-butoxy benzylidene p'-aminobenzonitrile (Compound IX) having C–N=64°, N–L=111°C was mixed with 4 parts of trans-4-n-butyl-alpha-α-chloro-4'-ethoxystilbene (Compound I) to obtain a nematic mixture which had C–N=–11° and N–L=+61°C. The material was tested in the same cell as in Example 1 and the material behaved exactly like the material of Example 1.

EXAMPLE 3

A stilbene mixture containing 60 mol% of trans 4-n-butyl-alpha-α-chloro-4'-ethoxystilbene (Compound I) and 40 mol% Trans-4-octyl-alpha-chloro-4'-ethoxystilbene (Compound V) was found to have C–N=1°C and NL=57.5°C. Five parts of this mixture were mixed with 1 part of p-n-butoxy benzlidene-p'-aminobenzonitrile (Compound IX) to obtain a nematic mixture which became a gel without well-defined nematic-crystal transition below –60°C, and upon heating the gel became nematic which eventually became isotropic at 65.5°C. The material was tested in a ½ mil display cell, as described above, and it was found that even when operated at the low voltage of 3V either DC or AC (rms), a good contrast was obtainable. The switching characteristics were similar to that in Example 1.

EXAMPLE 4

The material p-ethoxy benxylidene-p'-aminobenzonitrile (Compound VIII) was used, instead of Compound IX, in the mixture of Example 3 to obtain a nematic mixture which had very similar characteristics to that of the mixture in Example 3.

EXAMPLE 5

A mixture was formed from 2 parts of the stilbene mixture of Example 3 (Compounds I and V) was mixed with one part of p-n-hexyloxy benzylidene-p'-amino benzonitrile (Compound X). The mixture gelled when cooled to –100°C and upon re-heating had an N-L point of 71°C. The electrical response was similar to the mixture of Example 3.

The term "C–N" refers to the crystal-nematic transition temperature and the term "N–L" refers to the nematicisotropic transition temperature.

One or more of the stilbenes, which are compounds I through VII, are mixed with one or more of the aminobenzonitrile compounds VII, IX and X to form the liquid crystal mixture of the present invention. The range of the mixture is broad and is from 5 to 50% by weight of the aminobenzonitrile to the stilbene, although preferably their range is 10% to 20% by weight. In all cases, however, the viscosity was satisfactory as long as the amount of the aminobenzonitriles was kept at or below 50% by weight. The amount of stilbenes in the mixture therefor ranges from 50 to 95% by weight, with a range of 80 to 90% by weight being preferred.

In the mixtures of the examples, set forth above, the liquid crystal material was colorless and had a light white color, and the light white color remained stable under changes in voltage. In addition, the operating voltage was stable, that is, the turn on voltage did not vary with time or temperature. The operating temperature was –20° to +54°C, which is a particularly desirable temperature range for electro-optical displays used in watches.

The low operating voltage, using a cell of ½ mil. thickness, was 1.5 to 3 volts, so that the display may use the small battery cells found in watches.

The field effect electro-optical display of the present invention does not consume power in use, as contrasted with the power consumption requirements of those displays using dynamic scattering.

We claim:
1. A liquid crystal material of positive dielectric anisotrophy comprising a mixture of:
   A. from 50 to 95% by weight of at least one compound of the formula

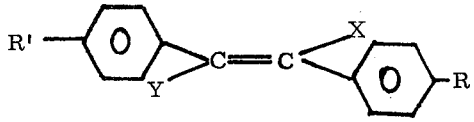

wherein
R is n-butyl, n-hexyl, n-heptyl or n-octyl;
R' is ethoxy, butyloxy, or hexyloxy;
X and Y are hydrogen or chlorine; and when X is hydrogen, Y is chlorine, and when Y is hydrogen, X is chlorine; and
B. from 5 to 50% by weight of at least one compound of the formula

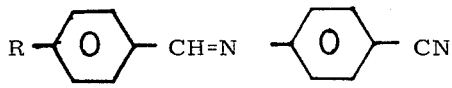

wherein
R is $CH_3-(CH_2)_n-O-$ or $CH_3-CH_2)_n -COO-$ wherein $n$ is an integer.

2. A liquid crystal material as claimed in claim 1 wherein (A) comprises from 80 to 90% by weight of said material and (B) comprises from 10 to 20% by weight of said material.

3. A field effect type liquid crystal display comprising in sequence a sheet of polarizer material, a conductive plate, a thin layer of liquid crystal material, a second conductive plate, a second polarizer sheet, and a light reflector wherein said liquid crystal material is a material as claimed in claim 1.

4. A liquid crystal material as claimed in claim 1 wherein compound A is selected from the group consisting of:
I Trans-4-n-butyl-alpha-chloro-4'-ethoxystilbene
II Trans-4-n-butyl-beta-chloro-4'-ethoxystilbene
III Trans-4-n-hexyl-alpha-chloro-4'-ethoxystilbene
IV Trans-4-n-heptyl-alpha-chloro-4'-ethoxystilbene
V Trans-4-n-octyl-alpha-chloro-4'-ethoxystilbene
VI Trans-4-n-butyl-alpha-chloro-4'-butyloxystilbene
VII Trans-4-n-butyl-alpha-chloro-4'-hexyloxystilbene; and compound B is selected from the group consisting of:
VIII p-Ethoxybenzylidene-p'-aminobenzonitrile
IX p-n-Butoxybenzylidene-p'-aminobenzonitrile
X p-n-Hexyloxybenzylidene-p'-aminobenzonitrile
XI p-n-Octanoyloxybenzylidene-p'-aminobenzonitrile.

5. An electro-optical display comprising a first transparent conductive plate, a second spaced conductive plate, and a thin layer of liquid crystal material between the plates, the said material comprising at least 50% by weight of one or more compounds selected from the group consisting of:
I Trans-4-n-butyl-alpha-chloro-4'-ethoxystilbene
II Trans-4-n-butyl-beta-chloro-4'-ethoxystilbene
III Trans-4-n-hexyl-alpha-chloro-4'-ethoxystilbene
IV Trans-4-n-heptyl-alpha-chloro-4'-ethoxystilbene
V Trans-4-n-octyl-alpha-chloro-4'-ethoxystilbene
VI Trans-4-n-butyl-alpha-chloro-4'-butyloxystilbene
VII Trans-4-n-butyl-alpha-chloro-4'-hexyloxystilbene and between 5% and 50% by weight of one or more compounds selected from the group consisting of:
VIII p-Ethoxybenzylidene-p'-aminobenzonitrile
IX p-n-Butoxybenzylidene-p'-aminobenzonitrile
X p-n-Hexyloxybenzylidene-p'-aminobenzonitrile
XI p-n-Octanoyloxybenzylidene-p'-aminobenzonitrile

* * * * *